Feb. 15, 1949.   J. M. FLOUNDERS   2,461,594
STEAM HOSE
Filed Oct. 1, 1945
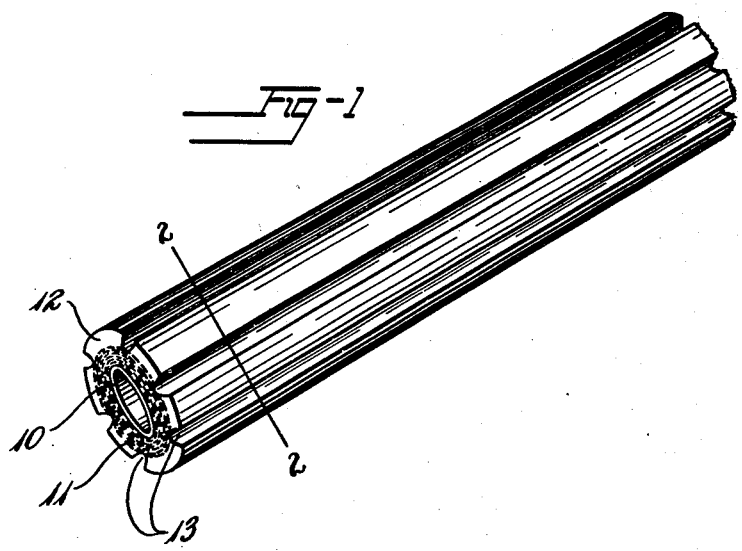
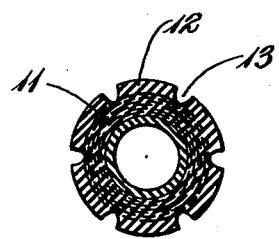
Inventor
James M. Flounders Patented Feb. 15, 1949

2,461,594

UNITED STATES PATENT OFFICE 2,461,594

STEAM HOSE

James M. Flounders, Cuyahoga Falls, Ohio, assignor to The B. F. Goodrich Company, New York, N. Y., a corporation of New York Application October 1, 1945, Serial No. 619,513

5 Claims. (Cl. 138—55)

This invention relates to flexible hose for conducting steam or other hot fluid.

Heretofore difficulties have been encountered in the use of steam hose in that the heat of the steam expanded air entrapped in the rubber-like material of the hose wall causing blistering of the wall.

Objects of the invention are to prevent blistering of the wall of the hose, to provide a path of low resistance to escape of expanded gases before they reach the outer surface of the hose, to provide greater flexibility, and to provide for cooling the outer surface of the hose.

These and other objects will appear from the following description and the accompanying drawings.

Of the drawing,

Fig. 1 is a perspective view of a section of hose constructed in accordance with and embodying the invention.

Fig. 2 is a cross-section thereof, taken on line 2—2 of Fig. 1.

Referring to the drawing, the numeral 10 designates a tubular lining of heat-resisting flexible rubber-like material, such as soft, vulcanized rubber composition, either natural or synthetic, or other material having the physical properties of a soft rubber composition. About the lining is a tubular reinforcing body 11 of woven or braided material. The reinforcing body may be made entirely of cotton, rayon, or other cords woven to provide a fabric which is wound about the lining and may comprise layers of wire or asbestos, or such cords or wires may be braided about the lining in layers as desired. The cords or wires may be coated with rubber-like material or other adhesive composition before being braided or coatings of rubber-like material or other adhesive composition may be applied over certain of the layers of cord or wire after they have been braided in place. In one form of the invention, the tubular reinforcement is constructed by winding rubberized woven fabric about the tubular lining to provide a plurality of layers, and a tubular jacket of cords is braided about the fabric layers in one or more layers.

A protective covering of rubber-like material is provided about the reinforcing body and is united to the other parts of the hose by a bond resulting from vulcanization of the material. Axially extending grooves 13 are formed preferably at regularly spaced intervals about the covering and extending from the outer surface substantially through the covering so as to leave a thin film of the rubber-like material between the bottoms of the grooves and the outermost layer of the reinforcing body.

The grooves provide ventilation along the covering to provide better cooling thereof and provide a path of low resistance to penetration through which gases entrapped within the wall of the hose during manufacture or generated in the reinforcing body after the hose is manufactured and in use may escape by penetration of the thin film at the bottom of the grooves and thereby prevent blistering of the outer portion of the covering. They also provide a better grip to the hand when handling the hose.

In manufacturing the hose the tubular lining is first formed as by extruding a rubber-like material to provide a continuous tube. The reinforcing body is then applied by wrapping or braiding, or both, about the lining. The covering is then applied as by extruding rubber-like composition about the core provided by the lining and reinforcement.

For vulcanizing the hose, the hose is preferably encased in a jacket of lead by extrusion of the lead thereabout and steam or hot water is circulated through the enclosed hose under pressure to vulcanize the rubber-like material. The lead is extruded with ribs to form the grooves in the covering. The jacket of lead is then split and stripped from the hose. The lead jacket fills the grooves 13 and holds them in shape during the vulcanizing operation.

Variations may be made without departing from the scope of the invention as it is defined by the following claims.

I claim:

1. A flexible hose for handling heated fluids, said hose comprising a tubular lining of flexible material resistant to heated fluids, a reinforcing body on said lining, and a covering of flexible material having high resistance to penetration of fluids, said covering being recessed in the outer surface thereof substantially to said reinforcing body for venting communication of said reinforcing body with the atmosphere outside said hose.

2. A flexible hose for handling heated fluids, said hose comprising a tubular lining of flexible material resistant to heated fluids, a reinforcing body on said lining, and a covering of flexible material having high resistance to the penetration of fluids, said covering being grooved in the outer surface thereof substantially to said reinforcing body for venting communication of said reinforcing body with the atmosphere outside said hose.

3. A flexible hose for handling heated fluids, said hose comprising a tubular lining of flexible material resistant to heated fluids, a reinforcing body on said lining, and a covering of flexible material having high resistance to penetration of fluids, said covering being recessed in the outer surface thereof substantially to said reinforcing body and having at the recessed portions a thin film of said covering material of low resistance to penetration of gases for venting communication to the atmosphere outside said hose.

4. A flexible hose for handling heated fluids, said hose comprising a tubular lining of flexible material having the physical properties of soft vulcanized rubber resistant to penetration of heated fluids, a reinforcing body on said lining, and a covering of flexible material having the physical properties of soft vulcanized rubber having high resistance to penetration of fluids, said covering being recessed in the outer surface thereof substantially to said reinforcing body and having at the recessed portions a thin film of said covering material of low resistance to penetration of gases for venting communication with the atmosphere outside said hose.

5. A flexible hose for handling heated fluids, said hose comprising a tubular lining of flexible material having the physical properties of soft vulcanized rubber resistant to penetration of heated fluids, a reinforcing body on said lining, and a covering of flexible material having the physical properties of soft vulcanized rubber having high resistance to pentration of fluids, said covering being grooved longitudinally in the outer surface of the hose substantially to said reinforcing body and having at the bottom of the grooves a thin film of said covering material having low resistance to pentration of gases for venting communication with the atmosphere outside said hose.

JAMES M. FLOUNDERS.

REFERENCES CITED

The following references are of record in the file of this patent:

UNITED STATES PATENTS

| Number | Name | Date |
|---|---|---|
| D. 111,981 | Koger | Nov. 1, 1938 |
| 1,190,292 | Hopkins | July 11, 1916 |
| 1,668,560 | Healy | May 8, 1928 |
| 2,184,326 | Thomas | Dec. 26, 1939 |
| 2,273,200 | Hoff | Feb. 17, 1942 |